(12) United States Patent
Andersch

(10) Patent No.: US 6,921,991 B2
(45) Date of Patent: Jul. 26, 2005

(54) AIR-COOLED COIL UNIT OF A LINEAR MOTOR

(75) Inventor: Walter Andersch, Kirchheim (DE)

(73) Assignee: Siemens Aktziengesellschaft, Munich (DE)

(*) Notice: Subject to any disclaimer, the term of this patent is extended or adjusted under 35 U.S.C. 154(b) by 0 days.

(21) Appl. No.: 10/853,201

(22) Filed: May 26, 2004

(65) Prior Publication Data
US 2004/0217658 A1 Nov. 4, 2004

Related U.S. Application Data

(63) Continuation of application No. PCT/DE02/04307, filed on Nov. 25, 2002.

(30) Foreign Application Priority Data
Nov. 29, 2001 (DE) .......................... 101 58 694

(51) Int. Cl.[7] .............................................. H02K 41/00
(52) U.S. Cl. .............................. 310/12; 310/13; 310/15; 310/58; 310/63; 318/135
(58) Field of Search .............................. 310/12, 13, 15, 310/58, 63; 318/135

(56) References Cited

U.S. PATENT DOCUMENTS

| 4,172,229 | A | | 10/1979 | Guimbal |
| 4,749,921 | A | | 6/1988 | Chitayat |
| 5,642,013 | A | | 6/1997 | Wavre |
| 5,834,862 | A | * | 11/1998 | Hartzell ....................... 310/12 |

FOREIGN PATENT DOCUMENTS

| DE | 19604642 A1 | | 8/1997 | |
| DE | 196 04 642 A1 | * | 8/1997 | .......... H02K/41/02 |
| DE | 19842384 A1 | | 3/2000 | |
| JP | 01034105 | | 2/1989 | |
| JP | 04183258 | | 6/1992 | |
| JP | 04340360 | | 11/1992 | |
| JP | 2001103726 | | 4/2001 | |
| JP | 2001224159 A | | 8/2001 | |

OTHER PUBLICATIONS

Derwent–Abstract—DE 19842384A1; Mar. 23, 2000; INA Wälzlager Schaeffler oHG, D–91074 Herzogenaurach.
Derwent–Abstract—DE 19604642A1; Aug. 14, 1997; Krauss–Maffei, D–80997 München.
English–Abstract—JP 2001224159A; Aug. 17, 2001; Yaskawa Electric Corporation, Japan– "Linear Slider".
English–Abstract—JP 04340360; Nov. 26, 1992; Fuji Electric Co. Ltd., Japan–"Cooler of linear motor for automatic conveyer".
English–Abstract—JP 2001103726; Apr. 13, 2001; Toyoda Mach Works Ltd, Japan–"Cooling device of electromagnetic coil in linear motor".
English–Abstract—JP 04183258; Jun. 30, 1992; Dalfuku Co. Ltd.; Japan–"Linear motor".
English–Abstract—JP 01034105; Feb. 3, 1989; Toshiba Corp., Japan–"Cooling device for linear motor".

* cited by examiner

Primary Examiner—Darren Schuberg
Assistant Examiner—Iraj A. Mohandedsi
(74) Attorney, Agent, or Firm—Jacob Eisenberg; Siemens AG

(57) ABSTRACT

The present invention is directed to a coil unit of a single-acting linear engine. The coil unit includes an iron core with coils that are linked with the iron core by way of a cast compound thereby forming a molded part. The molded part is enclosed by a housing having a narrow circumferential gap formed between the housing and the molded part. Through the gap, cooling air may flow or be blasted. The air extensively cools the iron core with the coils and thermally insulates the housing from the iron core and the coils.

7 Claims, 1 Drawing Sheet ations PCT/DE02/04307, filed Nov. 25, 2002, which
AIR-COOLED COIL UNIT OF A LINEAR MOTOR

CROSS REFERENCE TO RELATED APPLICATIONS

The present application is a continuation of International Application PCT/DE02/04307, filed Nov. 25, 2002, which designated the United States, and claims priority to German application DE 10158694.9, filed Nov. 29, 2001, the both of which are herein incorporated by reference.

BACKGROUND OF THE INVENTION

The invention relates to a coil unit of a linear motor with electromagnetic coils, having at least one iron core and having a housing which encloses said coils and iron core and which is open toward a magnetic track of the linear motor, with the iron core being permanently linked with the housing, the coils being secured in position by means of a cast compound and at least one cooling-air channel being provided within the housing.

A coil unit of said type is known from, for instance, DE 19842384 A1. According to this, a primary motor section is accommodated in a housing called a bogie truck and is able to travel over a secondary section of a rail-type guide housing. A primary section of said type customarily consists of a magnetic iron core which can be actuated by means of transverse coils. It is customary for coils of said type to be cast-sealed with the core and housing and thereby secured in position. Embodied in the housing according to column 3, rows 23 to 26 are ventilation slots intended to dissipate the motor's heat loss and minimize heating of the coil section.

A double-acting linear motor is furthermore known from U.S. Pat. No. 4,172,229 A wherein an iron core is inserted between the side flanges of a U-shaped magnetic section. The iron core is wound round with coils in whose spaces are located forced-ventilated cooling-air channels. Said cooling-air channels increase the distance between the coils, thereby increasing the pitch width between the active linear motor sections.

A linear motor is furthermore known from U.S. Pat. No. 5,642,013 A wherein the coil windings are set into slot-type recesses in the magnetic core. In their base area said recesses accommodate cooling tubes for a cooling fluid which has to be channeled in via a pressure pipe and channeled away via a return pipe. Pipe connections of this type are unsuitable for fast-moving coil sections of the kind used, for instance, for equipping substrates with electrical components. The cooling channels furthermore have a detrimental effect on the magnetic flux.

SUMMARY OF THE INVENTION

The object of the invention is to provide a coil unit having a single-acting linear motor whereby the thermal conditions are improved.

Said object is achieved by means of the invention according to claim 1. A very large cooling area having a maximum cooling effect is created by the circumferential gap. Said cooling area is located outside the effective magnetic range of the coils and core. These can be arranged with a narrow effective spacing so as to allow a high power density to be achieved.

A particular advantage is that the gap forms a thermal separation having a large area through which the coil section's heat loss is kept away from the surrounded bearing housing. Said housing consequently heats up to such a small extent that no noteworthy deformation is produced in the housing and distortion between lateral lineal guide sections secured on the housing is avoided. A linear motor is customarily employed as a positioning drive for a positioning arm where thermal distortion in the housing can result in a change in position that diminishes positioning accuracy.

The gap width can be reduced to, for instance, a space of 0.2 mm, producing an intensive material contact between the cooling medium and parts being cooled. In addition, the noise of the exiting cooling air is distributed, owing to the long gap length, over a long length and is accordingly reduced in its intensity. The customary cast-sealing of the coils and iron core with a framework housing is out of the question here. Assigning and the transmission of power is effected here via the narrow support elements, for example by means of connecting screws. This means that the contact area between the housing and coil section is reduced to singular thin supports so that the direct conducting of heat is virtually totally interrupted. The two molded parts must be precisely matched to each other in, for example, suitable casting molds to keep the gap's cross-section circumferentially consistent.

Advantageous developments of the invention are characterized in claims 2 to 8:

The cooling air is distributed evenly by means of the development according to claim 2 and taken completely around the parts being cooled so as to achieve the full cooling effect. It is possible here for the gap width to be enlarged, for example on the thermally less stressed outer edges of the iron core, to a greater cross-section.

By means of the development according to claim 3 it is possible to provide additional cooling channels further improving the cooling effect.

The support knuckles according to claim 4 can be embodied as shaped cam-like elevations on which the iron core is supported.

Thermal conduction between the iron core and housing is further reduced by means of the spacers according to claims 5 and 6. It is possible to employ a ceramic material whose thermal insulating effect is, for example, fifty times that of aluminum, thereby largely eliminating the bridging effect of the support elements.

It is possible by means of the development according to claim 7 to provide a multiplicity of support places on a flat surface having appropriate shape precision.

The development according to claim 8 makes a dimensionally stable link possible between the guide elements and housing. Elastic structures compensating for thermal distortion are unnecessary here so that a dimensionally stable link is formed between the guide elements and mounting base.

BRIEF DESCRIPTION OF THE SEVERAL VIEWS OF THE DRAWINGS

The invention is explained in more detail below with the aid of the exemplary embodiment shown in the drawings, wherein.

DETAILED DESCRIPTION OF THE INVENTION

Figure 1:
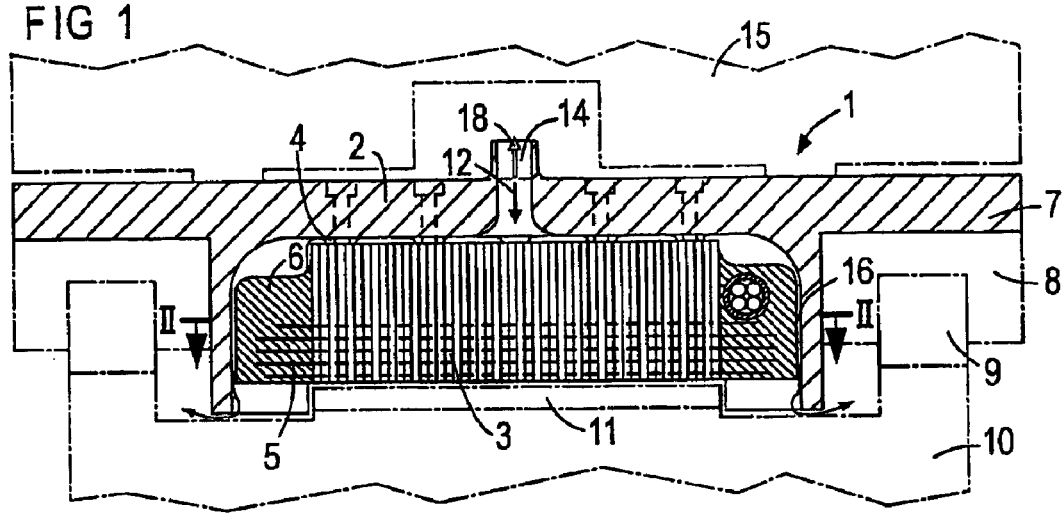
FIG. 1 shows a section through a coil unit of a linear motor at right angles to its direction of motion.
Figure 2:
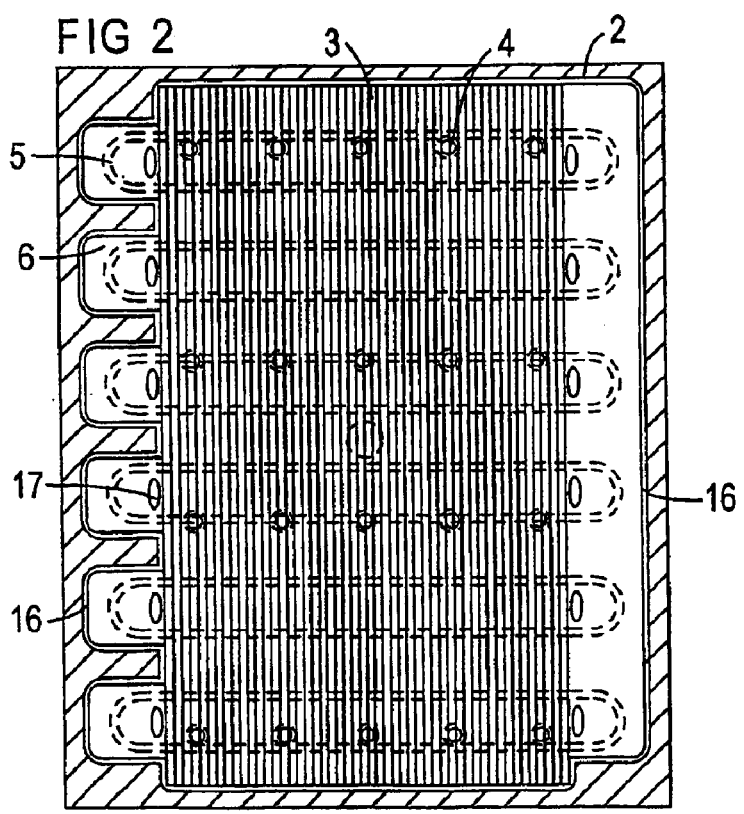
FIG. 2 shows a section through the coil unit along line II—II in FIG. 1.

According to FIGS. 1 and 2, a coil unit 1 has a housing 2 to which an iron core 3 formed from slats is secured via support elements 4 embodied as support knuckles shaped as a single piece onto the housing 2. The iron core 3 is permanently linked with windings of electrical coils 5 by means of a cast compound 6. The housing 2 has laterally protruding flange-type projections 7 serving to secure linear guide elements 8. Said elements act in conjunction with corresponding guide rails 9 of a stationary guide track 10. Between the guide rails 9, said track has a magnetic track 11 consisting of permanent magnets arranged side by side in the direction of travel.

The housing 2 is open at the side facing the magnetic track 11 and, on the other sides, encloses the iron core 3 with the coils 5 with a narrow spacing. Said spacing is presented as a circumferential gap 16 whose width has been reduced to the fraction of half a millimeter. Together with the cast compound 6, the iron core 3 and the coils 5 form a molded part with defined external contours to which the internal wall of the housing 2 has been precisely matched in order to ensure a defined gap width. Embodied in the cast compound 6 are additional cooling-air channels 17 positioned between the lateral end sections of the coils 5 and the iron core 3. The circumferential contour shown on the left in FIG. 2 produces a gap 16 extending between the ends of the coils and forming a correspondingly large cooling surface close to the heat source. Shown on the right in FIG. 2 is another variant where the gap 16 describes a linear envelop curve as a result of which the mass of the heavier housing, and hence the overall mass, is reduced.

The housing 2 has on its top side facing away from the magnetic track 11 an intake nozzle 14 for cooling air channeled in vertically to the top side of the iron core 3 according to the directional arrow 12. Said nozzle widens like a funnel toward the iron core 3 so that the cross-section of the flow is not narrowed at the transition to the gap 16. This allows the cooling air blown in through the intake opening to be distributed widely over the molded body heating up during operation in order to cool said body highly efficiently. A plurality of spaced apart intake nozzles can also be provided depending on the size of the iron core. It is also possible to extract the cooling air having an opposite direction of flow from the intake nozzle and channel said heated air out via an air-evacuation tube, for example from a machine housing, as indicated by means of a second directional arrow 18.

The gap forms a thermal separation between the active parts and the housing 2 with minimal physical contact at the point-like support elements 4. The housing is thereby substantially thermally insulated. Its top side facing away from the magnetic track 11 can thus serve directly as the mounting base for further structural parts with a high degree of positional stability.

Figure 3:
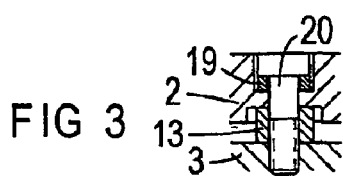
FIG. 3 shows an enlarged partial section through a variant of the support element of the coil unit according to FIG. 1.

According to FIG. 3, the support elements are embodied as separate ring-shaped spacers 13 having low thermal conductivity and made of ceramic or sintered plastic. To further improve the thermal insulation they are wider in diameter than the gap width, with the housing 2 having corresponding recesses. A washer 19 for the head of a metallic securing screw 20 is made of a material of the same type as the spacer 13.

I claim:

1. A coil unit of a single-acting linear motor, comprising:

a linear motor magnetic track;

a housing comprising an opening in a direction of said magnetic track and at least one cooling-air channel;

electromagnetic coils having at least one iron core, said coils secured into position by means of a cast compound, said coils and core accommodated within said housing, and said core permanently linked with said housing via narrow support elements;

said housing and iron core comprise mutually matched molded parts and are separated by a of circumferentially embodied gap less than 1 mm wide; and wherein said support elements comprise separate spacers having low thermal conductivity.

2. The coil unit according to claim 1, wherein the housing comprises an open underside, and the coil unit further comprises:

an intake opening for the cooling air, said opening located on the iron core's top side facing away from the magnetic track; and the gap is routed as far as the open underside of the housing.

3. The coil unit according to claim 1, further comprising additional cooling-air channels, said additional channels embodied in the cast compound between the windings of the coils and the iron core.

4. The coil unit according to claim 1 wherein said support elements comprise support knuckles shaped on the housing.

5. The coil unit according to claim 1, wherein:

said separate spacers are ring-shaped, comprise compression-proof ceramic and a wider diameter than said gap width; and said housing comprises recesses shaped to accommodate said spacers.

6. The coil unit according to claim 4, wherein:

said support elements are located on a top side of the housing; and said top side comprises a mounting base for further structural parts.

7. The coil unit according to claim 1, wherein said housing comprises lateral support projections for linear guide elements.

* * * * *